Oct. 9, 1945.   K. L. BRIMHALL   2,386,192
TRACTOR HITCH CONTROL
Filed Dec. 6, 1943   3 Sheets-Sheet 1
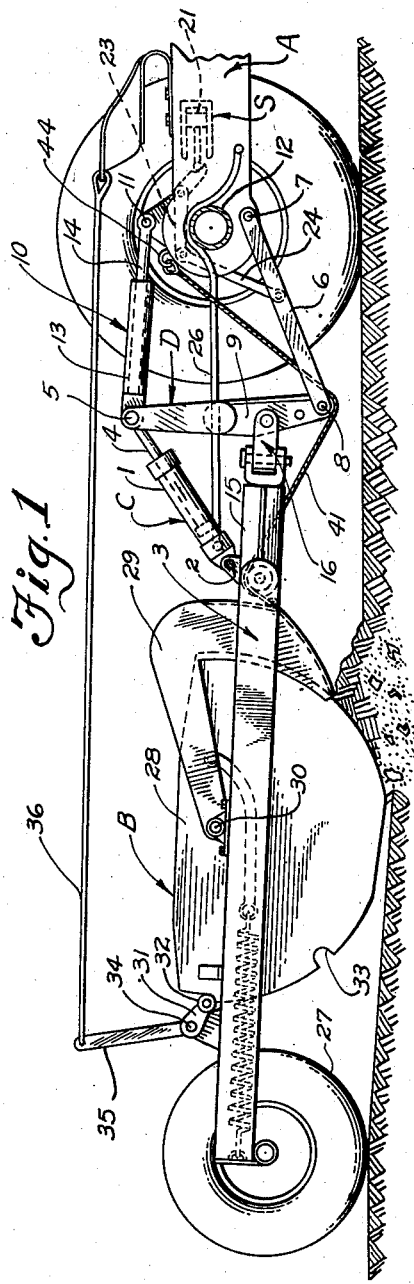
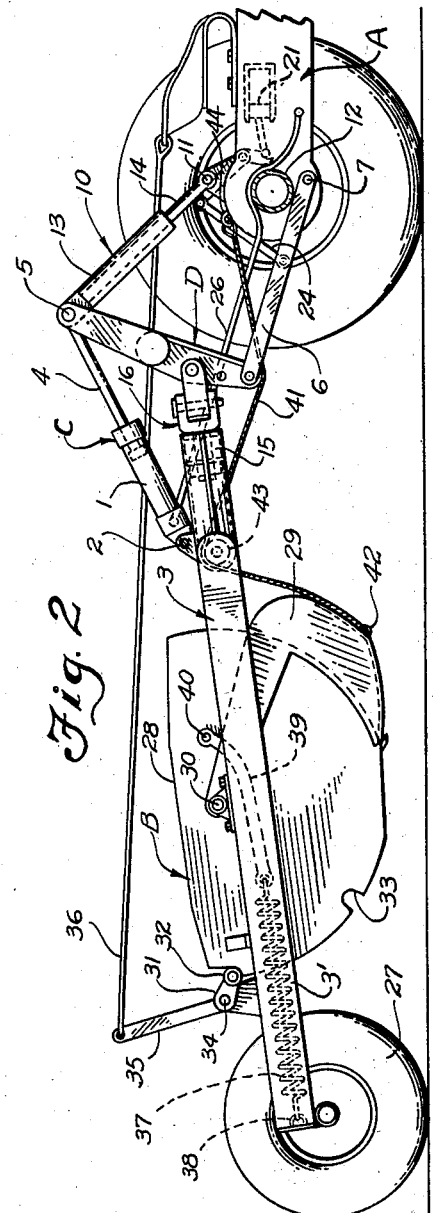
INVENTOR
BY *Kirk L. Brimhall*
AGENT

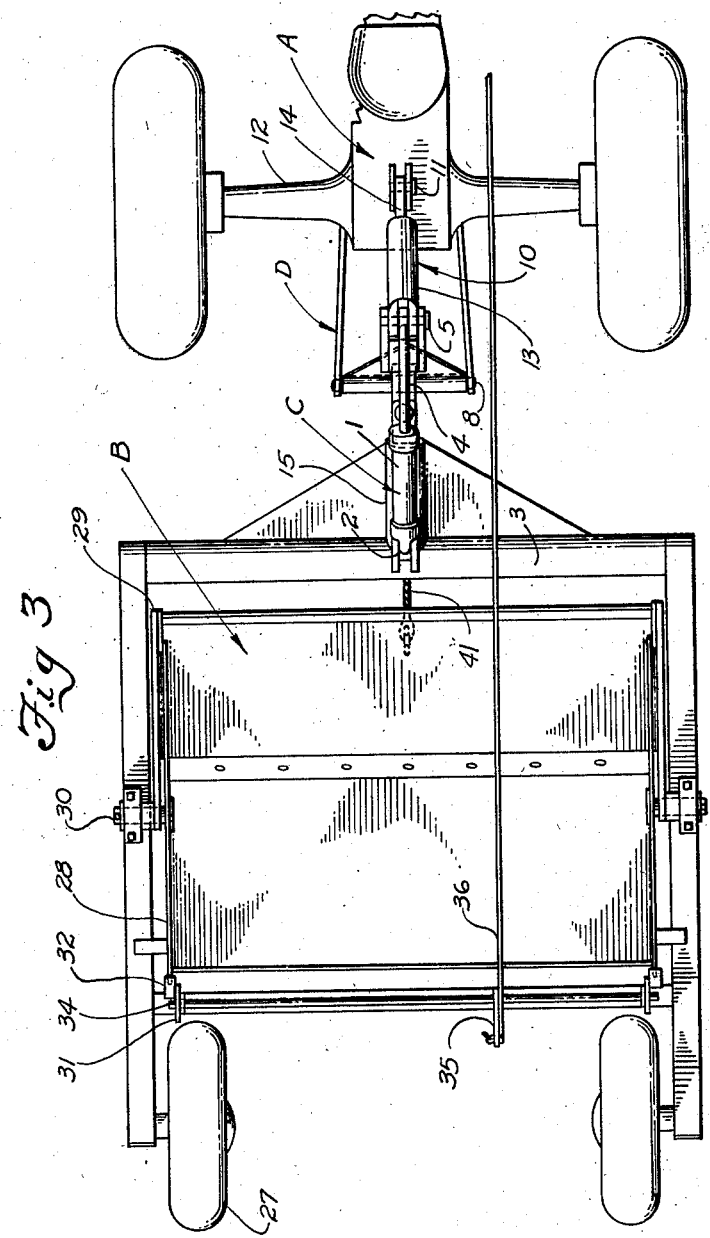

Oct. 9, 1945.　　　K. L. BRIMHALL　　　2,386,192
TRACTOR HITCH CONTROL
Filed Dec. 6, 1943　　　3 Sheets-Sheet 3
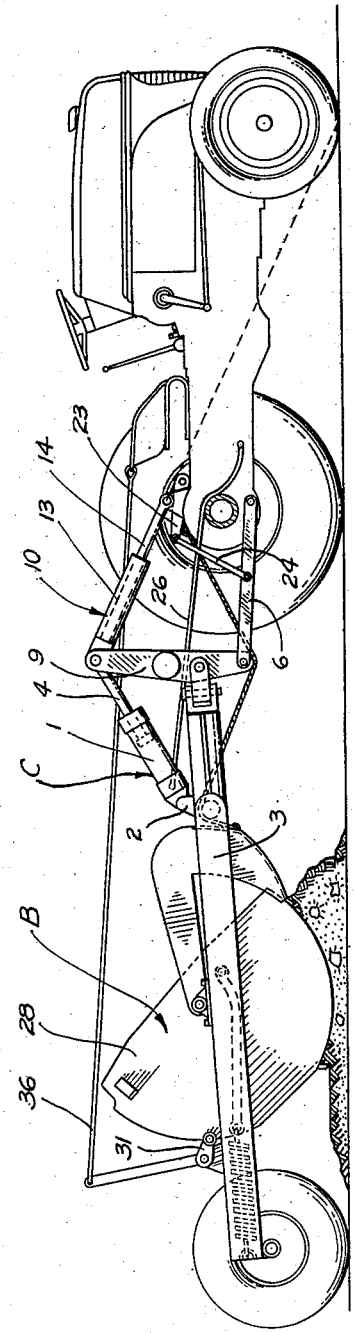
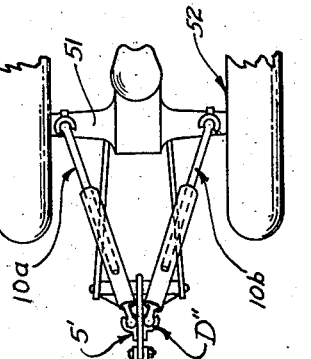
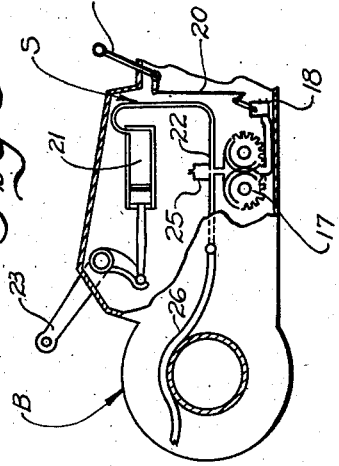
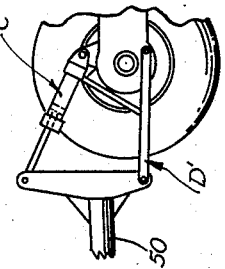
INVENTOR
KIRK L. BRIMHALL
BY
AGENT Patented Oct. 9, 1945

2,386,192

UNITED STATES PATENT OFFICE 2,386,192

TRACTOR HITCH CONTROL

Kirk L. Brimhall, San Gabriel, Calif., assignor to Len O. Bird

Application December 6, 1943, Serial No. 513,193

12 Claims. (Cl. 37—124)

This invention relates to power operated draft hitches or coupling units for lifting and lowering and controlling the operation of a trailing implement, such as hauling scraper or ground working implement which is coupled to a draft implement such as a tractor by means of the hitch or coupling unit.

An object of this invention is to provide in association with a draft hitch or coupling unit such as described, a power operated hydraulic cylinder arranged as a link to assist in the lifting and lowering of the trailing implement, distribute the forces developed during operation of said implements so as to hold the traction elements of the draft implement on the ground at all times and prevent such forces from upsetting the draft implement or impairing the operation thereof, all, in a particularly efficacious manner.

Another object of my invention is to provide a power operated hydraulic link such as described which is mechanically coupled with the tractor-carried hitch unit and hydraulically actuated and controlled by the hydraulic system for the hitch unit simultaneously with the operation and control of the hitch unit.

A further object of my invention is to provide an improved lifting and lowering hitch or draft unit in which a power operated hydraulic cylinder link is connected to the trailing implement and extends upwardly and forwardly therefrom and at its outer end is pivotally coupled to an extensible and retractible link element of the hitch unit which extends downwardly and forwardly and is connected to the draft implement, thereby forming an inverted V-shaped articulate "strut" which will operate in a particularly efficacious manner to accomplish the herein recited control of said implements and increase the efficiency thereof.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a fragmentary side elevation of a tractor and hauling scraper coupled with a hitch embodying the present invention and showing the scraper in loading position;

Fig. 2 is a fragmentary side elevation similar to Fig. 1, showing the scraper in carrying position;

Fig. 3 is a fragmentary top plan view of the assembly shown in Fig. 2;

Fig. 4 is a side elevation of the tractor and scraper coupled in accordance with my invention and showing the scraper in dumping position;

Fig. 5 is a fragmentary semi-schematic view of part of the tractor carried hydraulic system for raising and lowering the hitch and showing how a hydraulic line for actuating the hydraulic cylinder link is coupled to such system;

Fig. 6 is a fragmentary side elevation of a modified form of my invention;

Fig. 7 is a fragmentary top plan view of another modified form of my invention.

Referring to the drawings more specifically it is seen that my invention may be carried out in connection with a draft implement such as the tractor A and a trailing implement such as the hauling scraper B; by combining as within the scope of the showing herein contained, a hydraulic cylinder unit C with a power operated hydraulic hoisting hitch mechanism D for coupling the scraper to the tractor, thus rendering the two implements subject to control and operation in the manner and for the purposes hereinbefore and hereinafter set forth.

It should be noted that the tractor and the hauling scraper here shown are illustrative of but one embodiment of my invention and it is to be understood that any draft implement such as a truck or other motor vehicle equipped with a power operated hoisting hitch, and any trailing implement such as a cultivator, or like ground working tool, or vehicle trailers requiring lifting and lowering in whole or in part, are contemplated as within the scope of this invention, since it is obvious that my improved hitch control may be applied to such implements to operate in the manner herewith shown and described.

As shown in Figs. 1 to 4 the hydraulic cylinder unit C includes a cylinder 1 having a pivotal connection 2 at its lower end with the frame 3 of the hauling scraper B and provided with a piston 4 the outer end of which is pivoted as at 5 to the hitch unit D, whereby the cylinder and piston constitute a power operated link between hoisting hitch D and the scraper B.

In the present embodiment the hitch unit D includes a pair of draft links 6 pivoted at 7 to the tractor A and extending rearwardly therefrom and pivotally connected as at 8 to the lower end of an upright link 9. The upper end of the link 9 is pivoted by means of the aforesaid pivot 5 to the piston 4 and said pivot 5 also pivotally connects the outer end of an extensible compression link element 10 of the hitch unit with said upright link and said piston. The inner end of the extensible link 10 is pivoted as at 11 on the tractor, it being noted that the pivots 7 and 11 are respectively below and above the rear axle 12 of the tractor. The link 10 comprises a cylinder 13 and a piston-like part 14, or in other words, is telescopic so that it will lengthen when the front end of the tractor dips in traveling over rough ground or enters a depression, although normally the piston member 14 bottoms in the cylinder 13 so that the link acts as a rigid strut-like member under compression as will be hereinafter more fully described.

The upright link 9 is pivotally connected with the draw bar 15 of the scraper B by means of a clevis 16 and it is now apparent that the links 6, 9 and 10 may be swung upwardly and downwardly to raise and lower the frame 3 of the scraper B to control the operation thereof as will be hereinafter more fully described.

As is the practice in this art, the hoisting hitch D is hydraulically operated by means of a hydraulic system S on the tractor. As this system is well known it is shown but schematically and in part in Fig. 5 and includes a hydraulic pump 17 driven by the tractor engine, not shown, a control valve 18 operated by a lever 19 and linkage 20, a ram 21 and a fluid line 22 leading to the ram 21. The ram operates bell cranks 23 which are connected by links 24 with the draft links 6 so that the hitch unit may be raised and lowered when the bell cranks are rocked by the action of the ram when the fluid is introduced into and discharged from the ram under control of the valve 18.

In accordance with my invention the hydraulic cylinder link unit C is hydraulically connected to the system line 22 through a flexible hose line 26 so that unit C will operate simultaneously with the ram 21 under control of the lever 19 and valve 18. The unit C and the ram 21 are subject to release of the fluid therefrom by means of the relief check valve 25 provided in the usual manner in the tractor hydraulic system S. This relief check valve is set to open and allow fluid to be discharged from the ram and unit C back to the reservoir of the system when excessive hydraulic pressures, for example, around 1500 p. s. i. are developed in the system due to the scraper encountering an obstruction during loading. This relief takes the excessive load off the tractor, the hitch and the hydraulic equipment.

As here shown the scraper B has its frame 3 supported on wheels 27 and includes a tiltable bowl 28 and an apron 29 having common pivotal mountings 30 on the frame 3. The bowl is subject to being latched in scraping or loading position as shown in Fig. 1, in carrying position as shown in Fig. 2 and in dumping position as shown in Fig. 4, by means of latch members 31 which are adapted to engage in notches 32 and 33 in the bowl. These latch members are in the form of crank arms extending from a rotary shaft 34 on the frame 3. A lever 35 provides for turning the shaft to set and release the latch members and is operated by a cable 36 leading to the tractor.

Retractible springs 37 (see Fig. 2) are fixed at certain ends as at 38 to the rear of the frame 3 and lie in the channels of the channelled side members 3' of said frame. The other ends of the springs 37 are fixed to links 39 pivoted as at 40 to portions of the bowl forwardly of the axis of the bowl as shown in Fig. 2. The arrangement of these springs is such that they are under maximum tension when the bowl is in loading and carrying positions, whereby on releasing the latch means when the bowl is in carrying position, preliminary to dumping the load, the springs will assist in turning the bowl to its dumping position. Moreover, these springs counterbalance and cushion the bowl to prevent it from banging when gravitating from dumping into loading position.

In the present instance the apron 29 is arranged to be automatically lifted when the bowl is lowered from carrying position to loading position and likewise lowered when the bowl is raised from loading to carrying position. This is accomplished by means of a cable 41 fixed to the apron as at 42 and extended over a pulley 43 on the frame 3, thence to the tractor where it is secured as at 44. This cable passes under the upright link 9 of the hitch unit D so that slack is taken up and the apron lifted when the hitch is lowered and slack is created allowing the apron to close when the hitch is raised, it being seen that when the hitch is raised the frame 3 is raised and the bowl is thus moved from loading to carrying position, whereas when the hitch is lowered the frame 3 is lowered and the bowl is disposed in a loading position from which latter position it may be turned in the usual way to dump the load.

When the scraper bowl 28 is in loading position as shown in Fig. 1 the hitch unit D is in a lowered position and is hydraulically locked as is also the hydraulic cylinder link C. At this time the piston section 14 of the link 10 is bottomed in the cylinder section 13 of said link, while the piston 4 of the hydraulic link C is held against inward movement toward bottom of the cylinder 1 by the column of hydraulic fluid in the cylinder 1, line 26 and pump 17 up to the then closed valve 18. The links C and 10 now form an inverted V-shaped compression strut between the tractor A and the scraper B. This "strut" straddles the hitch-drawbar connection and serves a dual purpose in that if the front end of the tractor tends to lift off the ground due to the load imposed on the tractor, the strut in being immovable in a direction which would accommodate this tilting of the tractor, will positively prevent such tilting, while on the other hand the forces developed due to the load on scraper and tractor are transmitted by this "strut" so as to urge the front, also the rear, wheels of the tractor against the ground as though a downward thrust against the tractor were transmitted along the dotted line X in Fig. 4. The other function of the "strut" is that it permits the front end of the tractor to dip when entering a depression, in this instance the telescopic link 10 lengthens and the piston section 14 is extended, the hydraulic cylinder C and the links 6 and 9 not being appreciably moved due to this telescopic action of link 10.

When the scraper bowl is in carrying and dumping positions as shown in Figs. 2 and 4 respectively the piston section 14 of link 10 bottoms in the cylinder section 13 in the same manner as when the bowl is in loading position, but the hoisting hitch D is raised and the piston 4 of the cylinder 1 is extended so that link C is lengthened. In both instances the links C and 10 form an inverted V-strut to the same ends as when the bowl is in loading position as hereinbefore described. Thus in all positions of the scraper bowl the inverted V-strut functions in the same manner to prevent the lifting of the front tractor wheels and to distribute the load so as to hold the tractor "on the ground."

When the operator on the tractor opens the valve 18 to operate the ram 21 so as to raise the hitch D and lift the scraper frame 3 for the purposes aforementioned, the hydraulic fluid under pressure from pump 17 is transmitted through the flexible line 26 to the cylinder 1 so that simultaneously with the lifting of the hitch by the ram 21, the piston 4 is extended and exerts a force on the upright link 9 to assist in the lifting of the hitch unit and frame 3 of the scraper. The forces developed during this lifting operation are transmitted through the strut formed by links C and 10 so that the front end of the tractor is forced downwardly, any rearward thrust as would be transmitted if the front wheel tends to lift, being mechanically resisted by link 10 and hydraulically resisted by link C and the hitch D. The resultant of these forces causes the hitch to be lifted and the tractor to be held on the ground, yet rear wheels of the scraper may drop and cause a pivot action at the coupling thereof with the tractor and likewise the front wheels of the tractor may drop and cause a relative movement of the tractor and in both cases retrograde or opposite movement of the front wheels of the tractor is prevented.

It is now seen that the hydraulic cylinder link C in effect lifts part of the scraper load vertically and through the link 10 throws the load forwardly and downwardly on the rear tractor wheels and on the front tractor wheels also to give such wheels more traction as is essential when loading or dumping the scraper bowl.

In the modified form of my invention shown in Fig. 6 the hydraulically actuated hoisting hitch D' on the tractor is coupled to the scraper draw bar 50 and has a hydraulic cylinder link C' corresponding to link C but taking the place of link 10 and being arranged on the tractor and coupled to the hitch in the same manner that link 10 is arranged in the form of my invention shown in Figs. 1 to 4 inclusive. In this modified form the hydraulic link C' is operated in the same manner as the link C and serves the same purposes but is in effect a part of the hitch unit.

Another modified form of my invention as shown in Fig. 7 consists in the use of a pair of telescopic links 10a and 10b each identical with the link 10 of the first described form. The links 10a and 10b diverge from a common pivot 5' on the hitch D" and are pivoted near the ends of the axle 51 of the tractor 52 forming an inverted V-strut between the axle and the upper end of the hitch. In all other respects this form is the same as to construction, arrangement and operation as the first described form. The dual links in being in an inverted V arrangement provide more stability than a single link.

It will now be seen that my invention provides a power operated hydraulic link for use in combination with a power operated hoisting hitch unit on a draft vehicle so that a trailing implement may be raised and lowered to control the operation thereof through the instrumentality of the power operated link as well as the hitch unit since the link assists in the lifting action of the hitch, and at the same time serves the purposes of preventing the draft vehicle traction elements from being lifted off the ground while the hitch and link are not under power operation, and of distributing the loads developed during the lifting action of the link and hitch so that the draft vehicle is held on the ground and the efficiency of the draft vehicle and the trailing implement is increased. Thus, while I have shown a hydraulically operated link and hitch unit it is to be understood that my invention as above stated includes any link and hitch combination that is otherwise power operated provided it is arranged and operates as next above stated.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In combination, a trailing implement subject to being raised and lowered relative to a draft implement therefor, a draft implement, a hydraulically actuated hoisting hitch connecting said trailing implement to said draft implement including a telescopic link connected to the draft implement, a hydraulic operating system on one of said implements including means for raising and lowering said hitch to raise and lower said trailing implement; a hydraulic cylinder and piston assembly connected as a link between said telescopic link of said hitch and said trailing implement so that on hydraulic extension of said assembly the hitch will be lifted; and means for hydraulically connecting said cylinder to said system for hydraulic operation simultaneously with the operation of said means for raising and lowering said hitch.

2. In combination, a trailing implement subject to being raised and lowered relative to a draft implement therefor, a draft implement, a hydraulically actuated hoisting hitch connecting said trailing implement to said draft implement, a hydraulic operating system on one of said implements including means for raising and lowering said hitch to raise and lower said trailing implement; a hydraulic cylinder and piston assembly connected as a link between said hitch and said trailing implement so that on hydraulic extension of said assembly the hitch will be lifted; and means for hydraulically connecting said cylinder to said system for hydraulic operation simultaneously with the operation of said means for raising and lowering said hitch, said hoisting hitch including a piston and cylinder assembly forming a link of the hitch and being pivotally connected with said hydraulic piston and cylinder assembly.

3. In combination, a trailing implement subject to being raised and lowered relative to a draft implement therefor, a draft implement, a hydraulically actuated hoisting hitch connecting said trailing implement to said draft implement, a hydraulic operating system on one of said implements including means for raising and lowering said hitch to raise and lower said trailing implement; a hydraulic cylinder and piston assembly connected as a link between said hitch and said trailing implement so that on hydraulic extension of said assembly the hitch will be lifted; and means for hydraulically connecting said cylinder to said system for hydraulic operation simultaneously with the operation of said means for raising and lowering said hitch, said hitch including an extensible link connected to the draft implement and extending upwardly and outwardly therefrom in an inclined position, said cylinder and piston assembly extending upwardly and outwardly from said trailing implement and being connected to the link to form an inverted V-shaped strut straddling the connection between the hitch and said trailing implement.

4. In combination, a trailing implement subject to being raised and lowered relative to a draft implement therefor, a draft implement, a draft link pivotally connected to the draft implement, an upright link pivotally connected to the draft link and said trailing implement, an extensible link pivotally connected to the upright link and said draft implement, hydraulic means on the draft implement for swinging said links as a unit about the axes of their pivotal connections with the draft implement to raise and lower said unit and the part of the trailing implement connected therewith, a hydraulic cylinder and piston assembly connected as a link between said trailing implement and said upright link; and means hydraulically connecting said cylinder and piston assembly with said hydraulic means for operation responsive thereto to extend and retract the piston of said assembly.

5. In combination, a trailing implement subject to being raised and lowered relative to a draft implement therefor, a draft implement, a draft link pivotally connected to the draft implement, an upright link pivotally connected to the draft link and said trailing implement, an extensible link pivotally connected to the upright link and said draft implement, hydraulic means on one of said implements for swinging said links as a unit about the axes of the pivotal connections of the draft and extension links with said draft implement to raise and lower the unit and the part of the trailing implement connected therewith, a hydraulic cylinder and piston assembly connected as a link between said trailing implement and said upright link; and means hydraulically connecting said cylinder and piston assembly with said hydraulic means for operation responsive thereto to extend and retract the piston of said assembly simultaneously with the raising and lowering of said unit of links.

6. In combination, a trailing implement subject to being raised and lowered relative to a draft implement therefor, a draft implement, a draft link pivotally connected to the draft implement, an upright link pivotally connected to the draft link and said trailing implement, an extensible link pivotally connected to the upright link and said draft implement, hydraulic means on one of said implements for swinging said links as a unit about the axes of the pivotal connections of the draft and extension links with said draft implement to raise and lower the unit and the part of the trailing implement connected therewith, a hydraulic cylinder and piston assembly connected as a link between said trailing implement and said upright link; and means hydraulically connecting said cylinder and piston assembly with said hydraulic means for operation responsive thereto to extend and retract the piston of said assembly, said piston and cylinder assembly and said extensible link forming an inverted V-shaped articulate strut which straddles the connection of the trailing implement with said unit of links.

7. In combination, a hauling scraper having a portion subject to being raised and lowered to control the operation of the scraper, a tractor, a draft link pivoted to the tractor at a point below the axis of the rear wheels thereof, an upright link pivoted to said draft link, means connecting said portion of the hauling scraper with one of said links, a telescopic link pivoted at one end to said tractor at a point above said axis of the tractor, a hydraulic cylinder pivoted on the hauling scraper, a piston in said cylinder pivotally connected to said upright link, hydraulic means on the tractor for swinging the draft link, upright link and telescopic link on the axes of the pivotal connection of the telescopic and draft links with the tractor to raise and lower such links and the portion of the scraper connected thereto, and means hydraulically connecting the cylinder with said hydraulic means for extending and retracting the piston simultaneously with the raising and lowering of said draft, upright and telescopic links.

8. The combination with a tractor having a hydraulically operated hitch means subject to being raised and lowered and including an extensible link connected to the tractor, of a trailing implement connected with said tractor through said hitch means and having a part thereof disposed to be raised and lowered responsive to the raising and lowering of said hitch means, and a hydraulically extensible link connected between said implement and said hitch means also connected with the extensible link of said hitch means; and means for operating said hydraulically extensible link simultaneously with the operation of said hitch means to assist in raising and lowering the load on the hitch means and to hydraulically resist forces tending to lift the front of the tractor off the ground.

9. In combination, a tractor having a hydraulic power system, a trailing implement having a part subject to being raised and lowered, a hitch connecting said part of said implement with said tractor, means operated by said power system for raising and lowering said hitch and the part of the implement connected therewith, a telescopic link being a part of the hitch pivoted at one end to said tractor above the axis of the rear wheels thereof and extending rearwardly therefrom, a hydraulic cylinder and piston assembly pivotally connected with said telescopic link and said implement, said assembly together with said telescopic link forming an articulated strut between the implement and the tractor to resist compression forces and assist in lifting the load on the hitch; and means hydraulically connecting the cylinder with said power system for operation simultaneously with the hitch.

10. The combination with a tractor having a power operated hitch means subject to being raised and lowered including an extensible link connected to the tractor, of a trailing implement connected to said tractor through said hitch means and having a part thereof subject to being raised and lowered responsive to said hitch means, and a power operated extensible link means operatively connected with said extensible link of said hitch means and with said implement and constructed and arranged so that when operated it will assist in the lifting of the hitch means and distribute the implement load downwardly and forwardly on the tractor from a point above and readwardly of the rear axle of the tractor.

11. In combination with an implement, a tractor having a power operated hoisting hitch connected to the implement and operable for raising and lowering it, said hitch including a draft link, an upright link extending above the draft link and a telescopic link connected between the tractor and the upright link; a power operatde extensible and retractible link pivotally connected with the implement and said telescopic and upright links to form an articulate strut between the tractor and the implement and power means extending said power operated link incident to the raising of said hitch.

12. In a power operated control means for a hauling scraper adapted to be drawn by a tractor which tractor includes a hydraulically operated hitch means adapted to be connected to the hauling scraper and be operated for lifting and lowering a part of the scraper and wherein the hitch means includes a telescopic link pivoatally connected to the tractor above the rear axle thereof, a draft link pivotally connected to the tractor below the rear axle thereof and an upright link between said links and pivoted to one thereof; the improvement which embodies a hydraulically operated piston and cylinder assembly for connection as a link between said scraper and said upright and telescopic links, means affording the pivotal connection of said assembly to said upright and telescopic links, means affording the pivotal connection of the upright link to said scraper; said assembly and said telescopic link forming an inverted V-shaped articulated strut, and means affording the hydraulic actuation of said assembly to lengthen it incident to the hydraulic operation of the hitch means for lifting said hitch means and the part of the scraper connected thereto.

KIRK L. BRIMHALL.